(12) United States Patent
Loiacono (10) Patent No.: US 10,943,498 B1
(45) Date of Patent: Mar. 9, 2021

(54) SYSTEM AND METHOD FOR PERFORMING AUTOMATED SHORT CONSTRUCTED RESPONSE EVALUATION

(71) Applicant: MCGRAW HILL LLC, New York, NY (US)

(72) Inventor: Ronald Loiacono, Salinas, CA (US)

(73) Assignee: McGraw Hill LLC, New York, NY (US)

( * ) Notice: Subject to any disclaimer, the term of this patent is extended or adjusted under 35 U.S.C. 154(b) by 1085 days.

(21) Appl. No.: 14/212,944

(22) Filed: Mar. 14, 2014

Related U.S. Application Data (60) Provisional application No. 61/793,365, filed on Mar. 15, 2013.

(51) Int. Cl.
*G09B 7/02* (2006.01)
*G09B 5/00* (2006.01)

(52) U.S. Cl.
CPC . *G09B 7/02* (2013.01); *G09B 5/00* (2013.01)

(58) Field of Classification Search
CPC ...................................................... G09B 7/00
See application file for complete search history.

(56) References Cited

U.S. PATENT DOCUMENTS 8,380,492 B2   2/2013   Leacock et al.

OTHER PUBLICATIONS

CONORT, Xavier, "Short Answer Scoring—Explanation of "Gxav" Solution," Sep. 2012, 22 pages.
"The Hewlett Foundation: Automated Essay Scoring—Develop an automated scoring algorithm for student-written essays," 2014, Kaggle, http://www.kaggle.com/c/asap-aes, retrieved Apr. 22, 2014, 3 pages.
"The Hewlett Foundation: Short Answer Scoring," 2014, Kaggle, http://www.kaggle.com/c/asap-sas, retrieved Apr. 22, 2014, 3 pages.
Jesensky, James, "Automated Student Assessment Prize: Short Answer Scoring—Team JJJ—Technical Methods Paper," Sep. 2012, 26 pages.
Morgan, Jaison et al, "A Case Study to Promote Focused Innovation in Student Writing Assessment," Getting Smart, Jan. 2013, 31 pages.

(Continued)

*Primary Examiner* — Robert J Utama
(74) *Attorney, Agent, or Firm* — Rothwell, Figg, Ernst & Manbeck, P.C.

(57) ABSTRACT

A metric, such as a cosine similarity coefficient, is used to determine the degree of similarity between two responses. The assumption is that similar responses contain similar words with similar frequency counts (i.e., word lists). Word lists of the responses are used as a vector to assess the similarity between the word list for each student response and the word lists of responses having known scores. An iterative modeling process called semantic content similarity scoring, implemented by a content scoring module, augments differences among the various score-point responses by extending word lists to include, for example, synonyms of key words, key phrases (two or more words), key rubric scoring rule components, likelihood that a response would be given a specific score by a human rater. The word lists are also augmented by removing stop words.

10 Claims, 5 Drawing Sheets

(56) References Cited

OTHER PUBLICATIONS

Peters, Jonathan and Pawel Jankiewicz, "The William and Flora Hewlett Foundation (Hewlett Foundation), Automated Student Assessment Prize (ASAP)," 15 pages.
Shermis, Mark D. and Ben Hamner, "Contrasting State-of-the-Art Automated Scoring of Essays: Analysis," Mar. 29, 2012, 54 pages.
Shermis, Mark D., "Contrasting State-of-the-Art in the Machine Scoring of Short-Form Constructed Responses," Jan. 25, 2013, 49 pages.
Tandalla, Luis, "Scoring Short Answer Essay," Sep. 2012, 13 pages.
Topol, Barry et al., "Pricing Study Machine Scoring of Student Essays," Getting Smart, Feb. 2014, 45 pages.
Zbontar, Jure, "Short Answer Scoring by Stacking," Sep. 17, 2012, 7 pages.

SYSTEM AND METHOD FOR PERFORMING AUTOMATED SHORT CONSTRUCTED RESPONSE EVALUATION

CROSS REFERENCE OF RELATED APPLICATION

This application claims the benefit under 35 U.S.C. § 119(e) of the filing date of provisional patent application Ser. No. 61/793,365 filed Mar. 15, 2013, the disclosure which is incorporated herein by reference.

FIELD OF THE INVENTION

The present invention relates to systems and methods for performing automated, predictive scoring of content presented in short constructed responses to learning prompts, activities, quizzes, or assessments.

BACKGROUND OF THE INVENTION

None of the references described or referred to herein is admitted to be prior art to the claimed invention.

Unlike essays, which are routinely scored using automated scoring engines, open-ended short-answer items have traditionally been difficult to score using automated methods. Short constructed responses are typically scored manually by trained human raters. As used in this disclosure, short answers, or responses, are defined as responses to learning prompts or word problems in any language or subject area, including mathematics and non-Latin languages, and may comprise one word, one phrase, one sentence, or text up to three or four sentences long. Training responses are defined as responses scored by human raters and used to train a system that employs automated scoring methods.

One common approach used to accomplish short-response scoring is to compute a cosine coefficient, also referred to as a cosine similarity coefficient, for each training response based on a two-dimensional matrix of words used and their frequency count. This basic statistical approach is enhanced by applying latent semantic analysis (LSA), a technique in natural language processing, and in particular in vectorial semantics, of analyzing relationships between a set of documents and the terms they contain by producing a set of concepts related to the documents and terms.

LSA assumes that words that are close in meaning will occur in similar pieces of text or documents. A matrix containing word counts per paragraph or document (rows representing unique words and columns representing each paragraph or document) is constructed from a piece of text, and a mathematical technique called singular value decomposition can be used to reduce the number of rows while preserving the similarity structure among columns. Words are then compared by taking the cosine of the angle between the two vectors formed by any two columns, resulting in a computed cosine similarity coefficient for each comparison. Cosine similarity coefficients close to 1 represent very similar collections of words while values close to 0 represent very dissimilar collections of words (Dumais, 2005).

In the LSA approach, a master word list is formulated from human-scored training responses and other sources that represent vocabulary used to respond to the prompt. Then the word list is compared to each response (i.e., a sheet or screen on which one or more responses is written, printed, or otherwise displayed) and a frequency count is calculated for each word. All the responses are then organized and analyzed by score point, and each response is represented by a cosine similarity coefficient.

To assign a score for a specific response using the LSA approach, that response is first compared to all the zero-point responses in the training set—that is, all the responses deemed by human raters to have a score of zero—and its average cosine similarity coefficient is computed. Then that response is compared to all the one-point responses (i.e., responses deemed to have a score of one point) in the training set and a second average cosine similarity coefficient is computed. After a cosine similarity coefficient is computed for each score-point response set, the highest average cosine similarity coefficient yielded is an indication that the response being evaluated is representative of, and can be rated at, that score point. This process—sometimes referred to as prediction—results in assignment of a score for the response being evaluated.

Attempts to use LSA analysis for automated scoring of short constructed responses have met with inconsistent results when responses scored by human raters are used to train standard LSA software and unscored student responses are scored by the software and submitted to research scientists skilled in automated scoring methodologies for independent psychometric validation. In this process, the cosine similarity coefficients yielded from LSA do not predict response scores very well. Specifically, the top-performing responses (responses predicted to receive high scores) are better predicted than the lower-performing responses (responses predicted to receive low scores).

The present invention utilizes an iterative modeling process called semantic content similarity modeling, performed by a short-response content scoring module. The goal of semantic content similarity scoring is to reduce the overlap area between the score points and hence improve the prediction model for all score-point responses. This is achieved by augmenting the word list to refine the content similarity coefficients in order to accentuate differences among the various score-point responses, thus deviating significantly from the approach used in LSA. This new method is further differentiated from LSA in that it departs from the singular value decomposition technique.

SUMMARY OF THE INVENTION

Aspects of the present invention are embodied in systems, apparatus, and processes that help to achieve more accurate scoring than traditional methods by enhancing the cosine similarity coefficient calculation. This approach accepts numbers and symbols as well as letters as responses, and can be used to score short written responses in multiple domains, including language arts, mathematics, science, and social studies, in English or other languages. It will be apparent to one of ordinary skill in the art that this approach can also be used in combination with automated scoring of extended open responses (i.e., essays).

The present invention comprises a content scoring module that automatically assigns a score to a short constructed response entered by a test-taker interacting with a computer-based assessment. The content scoring module is configured to determine a score based on comparison of an input response with a set of model responses whose scores are known in order to determine content similarity between the input response and each model response. The content scoring module performs several steps to determine the level of similarity between an input response and each model response.

First, consistent with vectorial semantics, the content scoring module develops a master list of proximity n-grams (i.e., a word list) and then automatically and iteratively optimizes that list to create a separate list associated with each of a set of training responses previously scored by expert human raters, such that the training set includes a plurality of responses rated as scoring zero points (defined as a zero-point response) and an associated word list, a plurality of responses rated as scoring one point (defined as a one-point response) and an associated word list, and so on to represent each possible score-point rating—each with a plurality of responses and an associated optimized word list—through a maximum n-point rating established by the human raters.

Second, the content scoring module applies algorithms established in rubric scoring rules used by human raters to identify and categorize the most discriminating n-grams (words) on each list. This process mimics the decisions made by human raters applying the same rubric scoring rules, allowing the scoring module to approximate the scores generated by human raters. For example, in an item requiring the student to identify three pieces of evidence provided in a reading passage, the algorithm might specify "correct response=any 3 of the following 5 terms."

Third, the content scoring module automatically creates likelihood scores based on the scores generated by the process above, predicting the probability that the response entered would be assigned a specific score by a human rater, on a ten-point scale. For example, a likelihood score of 1 would indicate that there is a low probability that a response would be scored at specified score point, while a likelihood score of 9 would indicate a high probability that the response would be scored at a specified score point. The content scoring module assigns a likelihood score for each possible score point on the scale for each student response.

Finally, the content scoring module creates a final (predicted) score for each short constructed response by combining key elements determined in previous steps of the scoring process. Each rubric scoring rule may be applied or not. If applied, a weight of 1 is assigned; if not applied, a weight of 0 is assigned. Cosine similarity coefficients, weighted rubric scoring rules, and likelihood scores are combined as input into a neural network to produce a final (predicted) score for each response.

The content scoring module integrates existing software tools to convert student responses to root word forms and to provide advanced neural network and genetic algorithms used to create scoring nets. An example embodiment uses the Connexor Parser to convert student responses and the Ward Systems Group, Inc. NeuroShell Classifier 3.0 to create scoring nets. It will be apparent to one of ordinary skill in the art that any similar commercial or noncommercial tagger and/or parser, and/or any similar commercial or noncommercial machine learning engine (neural network programs), can alternatively be integrated into the content scoring module, and references to specific commercial or noncommercial algorithm, software, program, etc. are intended to encompass any algorithm, software, program, etc. now known or later developed having comparable functionality as implementable in the context of the present disclosure.

In various embodiments, the present invention enhances the cosine similarity coefficient calculation in the following ways:

1. In addition to one-word entries in the word list:
   a. Key phrases (two or more words) are added to the master word list.
   b. Rubric scoring rules (for a total score and for each response part, or score point, defined by the human raters) for the model response are added to the word list 102.
   c. Likelihood weights for each score point are assigned to the master word list.
2. A separate word list 111 is constructed for each score point.
3. Two sets of cosine similarity coefficients are created, one using the entire word list and the other using the word lists by score-point designation.
4. The number of cosine similarity coefficients is reduced by combining adjacent score-point responses.

The automated short-response scoring method described in the present invention, also referred to as the content scoring module, can enable faster and more cost-effective scoring of short constructed responses by reducing the need for handscoring. This capability can help learning and assessment administrators lower the cost of scoring and achieve shorter turnaround times for short constructed responses.

Other features and characteristics of the present invention, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

DESCRIPTION OF THE DRAWINGS

The accompanying drawings, which are incorporated herein and form part of the specification, illustrate various, non-limiting embodiments of the present invention. In the drawings, common reference numbers indicate identical or functionally similar elements.

DETAILED DESCRIPTION OF THE PREFERRED EMBODIMENT

Unless defined otherwise, all terms of art, notations, and other scientific terms or terminology used herein have the same meaning as is commonly understood by one of ordinary skill in the art to which this disclosure belongs. Many of the techniques and procedures described or referenced herein are well understood and commonly employed using conventional methodology by those skilled in the art. As appropriate, and unless otherwise noted, procedures involving the use of commercially available software and algorithms are generally carried out in accordance with manufacturer-defined protocols and/or parameters. All patents, applications, published applications, and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

As used herein, "a" or "an" means "at least one" or "one or more."

Aspects of an implementation of the invention are described below with reference to FIGS. 1-3. In accordance with aspects of the present invention, techniques are implemented to enhance accuracy in prediction of scoring short-answer items. These techniques can be implemented individually or in any combination of two or more of the techniques. Each technique is described below. It will be apparent to one of ordinary skill in the art that these techniques represent some, but not all, potential enhancements of the scoring process described in this invention.

Identification of Word List Entries.

Many techniques have been deployed to create a word list 100, 101 that helps discriminate the cosine similarity coefficients among the different score-point responses (in the Figures, the term "paper" corresponds to one or more response(s)). In step 100 of FIG. 1, a word list is automatically created based on training responses 104 (responses previously graded by human raters, having different scores) and, optionally, ancillary materials 105 (such as related text, any reading stimulus, the stem, or rubric or scoring examples), and a master word list is stored at step 101. In one embodiment, at step 102 additional variables are used to create an augmented word list 103 to enhance the effectiveness of the content evaluation module in discriminating among different score-point responses. The augmented word list 103 will include additional variables, or entries, added to the word list and included in the cosine similarity coefficient calculations. In this embodiment, additional variables used to create the augmented word list 103 include:

. . . a. Reduction of all word list entries to their root word equivalent.

. . . b. Collapsing of one- or two-word synonyms into the same entry.

. . . c. Addition of phrases comprising two or more words. Word phrases must be contained in either a specific sentence or a paragraph.

. . . d. Manual entry of rubric scoring rules 102.

. . . e. Addition of likelihood scores generated by the content scoring module.

In the context of the present invention, a "word list" as used in the invention may include entries other than single written words and may include, for example, phrases (multiple-word expressions), numbers, symbols, and/or other means used by a respondent in expressing a response to a stimulus, and may include verbal or other audible response elements or system interactions, such as computer manipulations performed with an input device such as a computer mouse, light pen, stylus, touch screen, microphone, eye-movement or other motion sensor, etc. used to respond to a stimulus. Certain non-word entries, such as rubric scoring rules, likelihood scores, scores derived from interaction with a computer interface or other element, or other scores may, in some embodiments, be derived from words of the word list as related to response scores. Thus, in the context of the description herein of aspects of the invention, the term "word list" is not necessarily limited to a list of written words and may include word and non-word entries, as described above, and may be embodied in data files of written or writable words and symbols, graphics files, audio files, sensor interface logs, system interface activity logs, or any other means for storing and manipulating response elements or other information that may be determinative of the correctness of a response.

The term "cosine similarity coefficient" is used throughout this description because the coefficients determine the similarity between different responses and the use of that term is pervasive in the context of this approach. It should be understood, however, that the present invention is not limited to the use of cosine similarity coefficients per se and also encompasses other computations of relationships between specific word list entries to determine similarities between responses that include or do not include such entries. These variables are described below for one embodiment of the present invention.

Rubric Scoring Rules

Rubric scoring rules enable the content scoring module to score the student response according to the guidelines outlined in the scoring rubric provided for each item by the item writer. The basic approach recommended is to create a rubric scoring rule in the word list 102 for each score point defined in the item scoring guidelines.

The general approach used to implement rubric scoring rules is to study the rubric and the student training responses and then identify one or more key phrases that would indicate a correct response from the student, based on the rubric. Several parameters can be applied to construct the rubric scoring rules. This process can be repeated until the content scoring module achieves the desired accuracy for operational scoring. In a preferred embodiment, the content scoring module uses the following parameters to identify responses in each score-point group. These parameters form an input data structure in the software used to implement the content scoring module, as shown in the following example:

The word Rubric, followed by a two-digit sequence number, is used to designate a rubric scoring rule used to score the short constructed response. Rubric01 represents the first rubric scoring rule provided by the item writer for the item, as coded in the implementing software. This coding represents a rubric scoring rule used to score the short constructed response. In one embodiment, possible scoring parameters are coded as follows in the software used to implement the content scoring module.

In various embodiments, an exemplary rubric scoring rule may be represented as follows: Rubric01(Loc=__________, Wt=__________, %=__________, Man=__________), where:

Loc indicates the location of the key phrase(s) in the response to be scored, specifically:

(a) first sentence or paragraph
 (b) second sentence or paragraph
 (c) remaining sentence or paragraph
 (d) any sentence or paragraph Wt indicates the scoring weight applied to the rubric. In this embodiment, for a whole number, the software used to implement the content scoring module expects two digits starting at 01 and going up to 99. The content scoring module supports positive and negative software inputs as well as a zero value. For a positive number, the range of possible entries is 01 through 99 for a whole number or, for a decimal, a zero followed by a decimal point, followed by a one-digit number to represent the tenths, or 0.01 through 0.99. For a negative number, the range of possible entries is from −01 through −99 for a whole number or, for a decimal, −0.01 through −0.99.

When a partial score is generated, the content scoring module rounds the value to the nearest whole number down, indicating that the minimum threshold of agreement with the rubric standard has not been met (1.9 is rounded down to 1). This threshold can be set or modified by the user in accordance with rubric scoring rules. For example, in this embodiment, the software implementing the content scoring module can be modified by the user in several ways, such as by means of the following code designations:

% indicates the percentage of matched words or other elements in the response that will be used to determine if the response demonstrates the rubric standard. In this embodiment, the software implementing the content scoring module requires a two-digit number from 01 to 99.

Man indicates whether or not this rubric scoring rule is mandatory. If a rubric scoring rule is mandatory, failure to meet this rule will mean that all other rubric scoring rules will be scored at zero.

Cmb (an optional parameter) can be used to indicate whether two or more rubric scoring rules require combined scoring. In one embodiment, the content scoring module expects either && to represent an AND condition or || to represent an OR condition.

These parameters may be adjusted and other parameters may be used as the system is used to help apply the scoring rubric guidelines.

Multiple rubric scoring rules can be strung together, without limitation.

The content scoring module word list is manually extended to include entries for each rubric scoring rule and for a total rubric scoring rule 201, 202.

Likelihood Scores

Likelihood scores are automatically created to further discriminate responses into their proper score-point categories. There is a likelihood score for each score point on the scale. For example, on a two-point rubric, the student can receive a score of 0, 1, or 2. After the rubric scoring rule is applied, the content scoring module calculates the likelihood that the response is scored a 0, the likelihood that it is scored a 1, and the likelihood that it is scored a 2. The content scoring module creates a LikelyScore_0, LikelyScore_1, and LikelyScore_2. These additional scores are entered into the word list and utilized in the cosine similarity coefficient calculation.

The possible score for this score type (likelihood scores) ranges from 0 to 10. A score close to 0 indicates an extremely low probability that a response meets the criteria of the rubric, while a score close to 10 indicates a very high probability that a response meets the criteria of the rubric. Likelihood scores are extrapolated from the rubric scoring rules. The accuracy of the likelihood scores depends on how well the rubric scoring rules simulate human scoring. The higher the accuracy, the more influence the likelihood scores have on the cosine similarity coefficients, which indicate general agreement with a particular rubric scoring rule. The lower the accuracy, the less influence the likelihood scores have on the cosine similarity coefficients.

Several statistical techniques can be applied to calculate the likelihood score. In a preferred embodiment, this approach to calculation of the likelihood scores is based on the frequency distribution of a two-dimensional matrix of human score vs. computer-assigned score on the set of training responses.

A Separate Word List is Generated for Each Score Point 111.

Ordinarily, only single-word entries are used to compute the cosine similarity coefficients for each student response. Traditionally, responses with similar content have similar cosine similarity coefficients. To predict the score of a student response, the response is compared against all the zero-point responses, then all the one-point responses, and so on. This comparison yields a separate cosine similarity coefficient for each score-point response set. The highest cosine similarity coefficient indicates the most probable score for that response.

One unique method used by the present invention applies the cosine similarity coefficient calculation to the selection and use of separate word lists 111, 202 for each score-point response set. The system analyzes the master word list 201, and then applies statistical techniques in an effort to create (e.g., at step 110) a subset of words from the master word list that improves the separation of cosine similarity coefficients among the score-point responses. The resulting modified word lists may be referred to as score-specific word lists, represented at 202 in FIG. 2. Several optimization methods are applied and the results are statistically analyzed to determine the technique that predicts the "best."

Several statistical techniques are available to optimize the subset word lists by score point. One approach, indicated by step 112 in FIG. 1, is as follows.

Responses of a particular score point are expected to be similar, and thus analysis performed to compare each response of that particular score point to each other response of that particular score point would be expected to generate relatively high cosine similarity coefficients. Thus, to construct an optimized word list for each score point, the content scoring module goes through all the words in the master word list to determine each word's contribution to the cosine similarity coefficient computed. In particular, at steps 112, 113, for each word, the content scoring module removes the word and recalculates the cosine similarity coefficients for responses of all score points. The content scoring module then compares each response of the score point in question to all other the responses of that score point and computes an average cosine similarity coefficient for all the responses. If the average cosine similarity coefficient goes up—that is, the responses in that score-point group are computed to be more similar to each other when that word is removed than with that word present—that suggests that the word is not helpful in discrimination of score points and can be discarded from the word list. If the average cosine similarity coefficient goes down—that is, the responses are computed to be less similar to each other when that word is dropped—that suggests that the word is helpful in discrimination, and should be kept in the word list.

Figure 1:
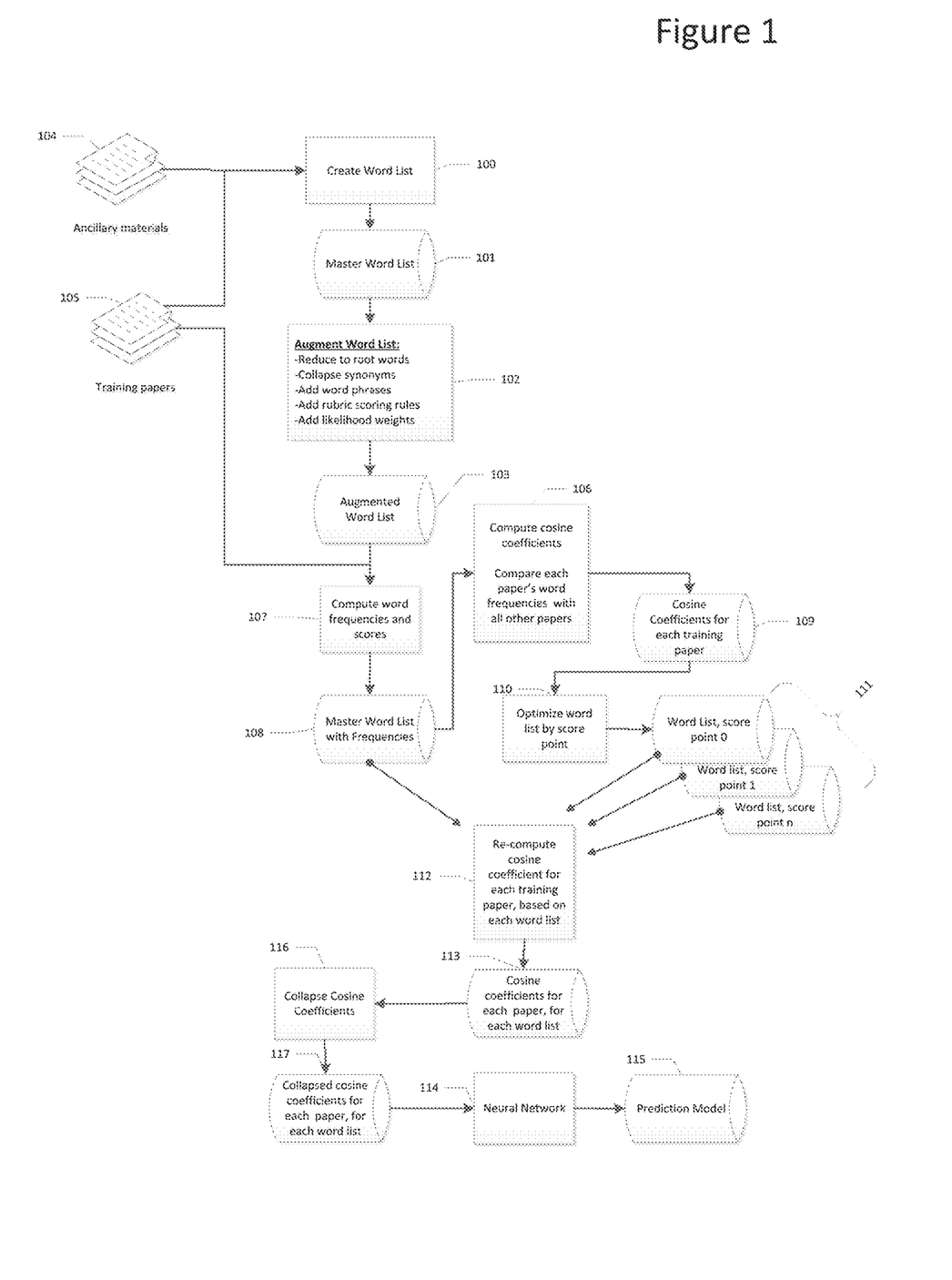
FIG. 1 is a flowchart showing a score modeling process embodying aspects of the present invention.
Figure 2:
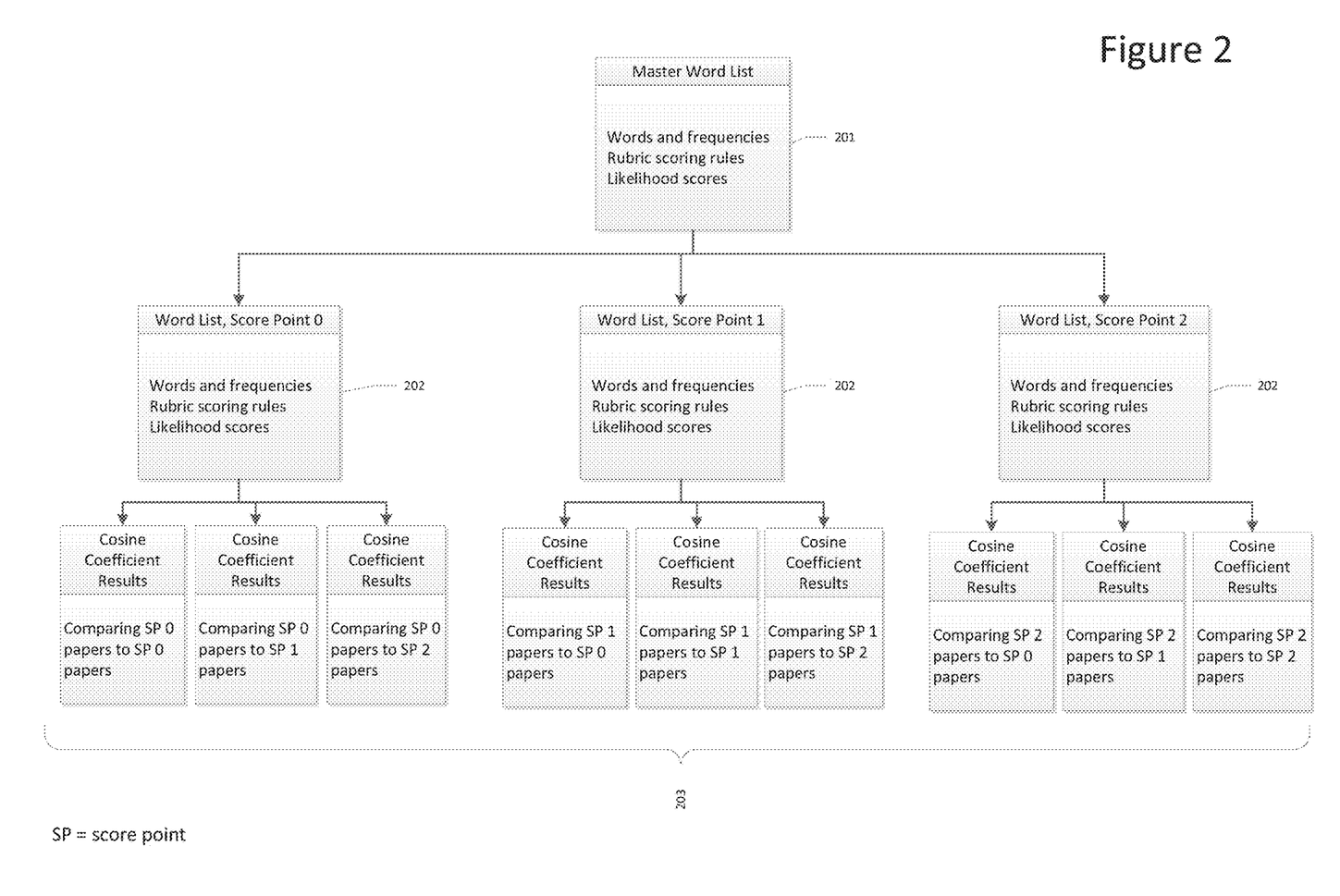
FIG. 2 is a block diagram showing the process used to create the cosine similarity coefficients for the scoring process embodying aspects of the present invention.
Figure 3:
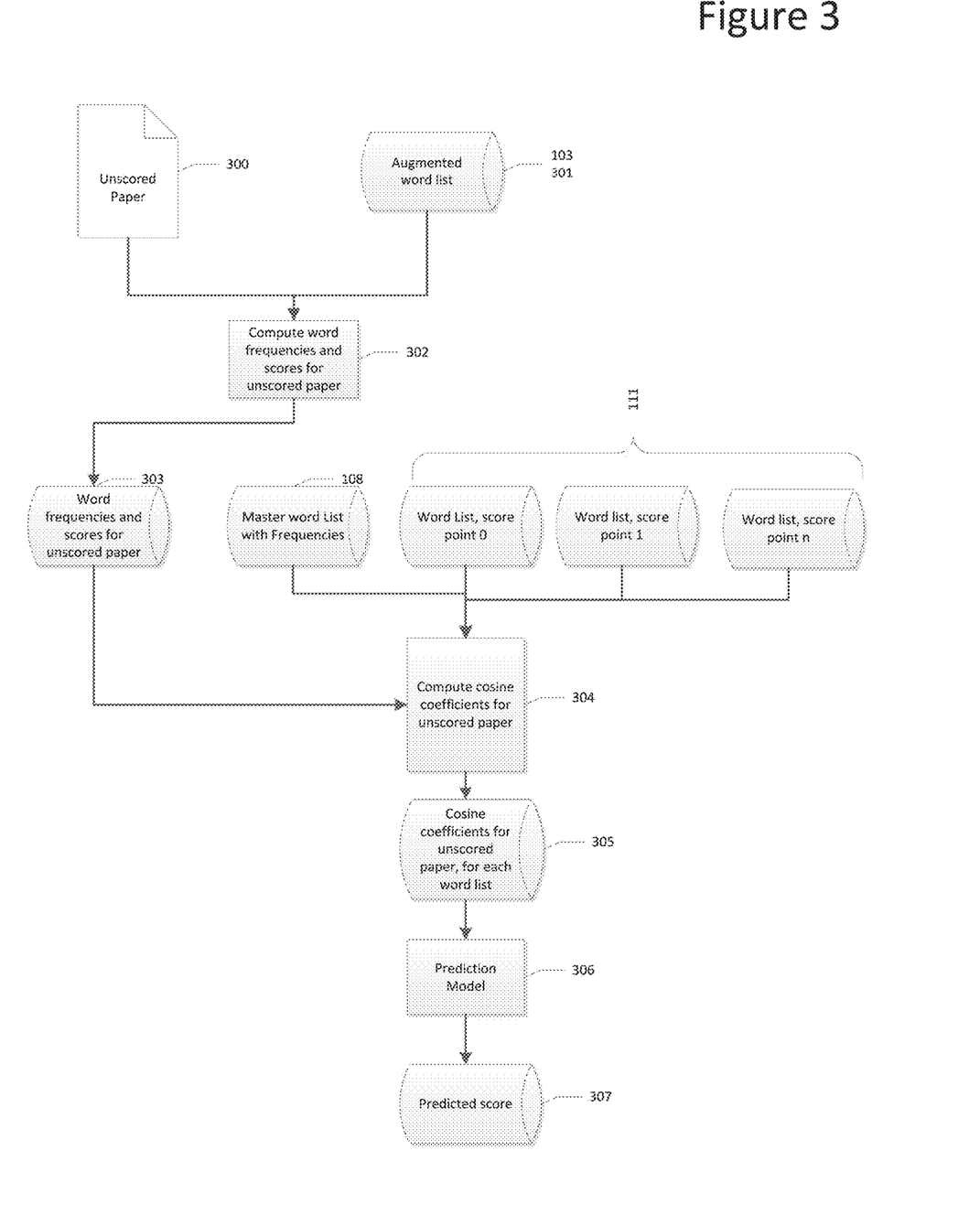
FIG. 3 is a flowchart showing a scoring process embodying aspects of the present invention.

In addition, as shown in FIG. 1, step 110 of the content scoring module may also compare the new average cosine similarity coefficient for all responses of the score-point group in question to the average cosine similarity coefficients for all responses of other score score-point groups (FIG. 2, 203). If removing the word improved score-point discrimination, the score points will become more distinct, as shown by an increased difference between the average cosine similarity coefficient of the score-point group in question and the average cosine similarity coefficients of other score-point groups. In this case, the word is discarded from the word list of the score-point group 110, 111.

When comparing the average cosine similarity coefficient of one particular score-point group to the average cosine similarity coefficient of another score-point group, several methods can be used to determine whether each word list entry was helpful. Following is a description of several techniques that can be used. It will be apparent to one of ordinary skill in the art that these techniques represent some, but not all, methods that can potentially be used to make this determination.

Targeted Comparison computes the difference by comparing the average cosine similarity coefficient of responses in the score-point group in question with the average cosine similarity coefficient of responses in the top-scoring response group.

Incremental Comparison computes the difference by comparing the average cosine similarity coefficient of responses in the score-point group in question with the average cosine similarity coefficient of responses in the next higher scoring response group.

Dual Comparison computes the difference by comparing the average cosine similarity coefficient of responses in the score-point group in question with the average cosine similarity coefficient of responses in the next higher-scoring and the highest-scoring response groups.

Ladder Comparison computes the difference by comparing the average cosine similarity coefficient of responses in the score-point group in question with the average cosine similarity coefficient of responses in the next two higher-scoring response sets.

Categorical comparison computes the difference by comparing the average cosine similarity coefficient of responses in the score-point group in question with the average cosine similarity coefficient of responses in the next lower-scoring and the next higher-scoring response groups.

Cosine Similarity Coefficient Matrix

Traditionally, a response score is predicted by calculating a cosine similarity coefficient for each score point (based on the comparison of that response to each of the score-point response sets). An embodiment of the present invention extends this concept by computing a set of cosine similarity coefficients for each optimized score-point word list, as schematically represented by steps/elements 106, 107, 109, 111, 112 in FIG. 1. This provides a two-dimensional matrix of cosine similarity coefficients and provides more information from which the content scoring module can base its prediction. The example below is a two-point rubric (0-2) and generates the following nine average cosine similarity coefficients.

Word list entries by score point vs. score-point response sets:

|  | 0-Point Responses (Response Set 0) | 1-Point Responses (Response Set 1) | 2-Point Responses (Response Set 2) |
| --- | --- | --- | --- |
| Word List 0 |  |  |  |
| Word List 1 |  |  |  |
| Word List 2 |  |  |  |

The content scoring module enhances this process at step 116 by collapsing adjacent response sets into one set. This creates a set of collapsed cosine similarity coefficients for each paper, for each word list 117 and reduces the cosine similarity coefficient calculations needed, and simplifies the comparison by reducing the number of categories being compared, which improves the discrimination. In the example below of a two-point rubric (possible score points=0, 1, 2), instead of running cosine similarity coefficients on all three groups of responses—those scoring 0, 1, and 2—the content scoring module combines response sets 1 and 2 and performs only one comparison of response set 0 to combined response set 1-2. In the case of Word List 1, no collapsing is possible because the two other response sets are not adjacent. When analyzing Word List 2, response sets 0 and 1 are combined. This collapsing process creates a matrix in which each word list is examined for each group of responses, or response sets, but adjacent response sets (those in adjacent cells of the matrix) are collapsed (combined), as shown below. The highest cosine similarity coefficients should be in the diagonal cells of the matrix running from upper left to lower right—that is, word list 0 should yield the highest cosine similarity coefficient for response set 0, word list 1 should yield the highest cosine similarity coefficient for response set 1, and so on. Put another way, the values in the diagonal cells represent the best score-point discriminators.

| Score point 0 | Score points 1-4 collapsed | | |
| --- | --- | --- | --- |
| Score point 0 | Score point 1 | Score points 2-4 collapsed | |
| Score points 0-1 collapsed | | Score point 2 | Score points 3-4 collapsed |
| Score points 0-2 collapsed | | | Score point 3 | Score point 4 |
| Score points 0-3 collapsed | | | | Score point 4 |

This collapsing (combining) technique decreases the number of response sets for which cosine similarity coefficients must be calculated. As shown in FIG. 2, three calculations must be performed for each score-point group in a two-point rubric. The number of calculations needed increases depending on the number of score points. Thus, the collapsing (combining) process reduces a three-point rubric from sixteen cosine similarity coefficients to ten, and a four-point rubric, from twenty-five to thirteen cosine similarity coefficients.

Additional Cosine Similarity Coefficients

In addition to the score-point word lists 111, the original master word list 108 is also utilized, and its set of cosine similarity coefficients generated at step 112. The master word list brings additional detailed information, contrasting the entire word list with the optimized subset word lists, which improves the prediction process and generates more accurate predictions.

In one embodiment of the present invention, the following tools are used for implementation of the content scoring module. It will be apparent to one of ordinary skill in the art that any similar commercially available tools can be used.

1. Microsoft C#2010 Express compiler.

2. Connexor Tag/Parser or an equivalent commercially-available content scoring module that can convert student responses to root words.

3. Ward System NeuroShell Classifier 3.0 114—This program uses advanced neural network and genetic algorithms for prediction. In one example, cosine similarity coefficients 117, 304, 305 generated by the content scoring module for an unscored response 300 are exported and loaded into the prediction software, which is then able to generate a prediction model 115, 306 that predicts the score 307 for that response 300 (See FIG. 3). It is important to note that several commercial prediction programs are available, any of which can be used to predict likely human scores based on cosine similarity coefficients.

Pre-Processing Steps:

Prior to training or scoring the student responses, several steps may be conducted to assist content scoring module in setup and processing. These steps may be performed manually or by means of additional software processes prior to implementation of scoring performed by the content scoring module.

1. Identify and correct spelling errors.

2. Identify likely synonyms of key words used by students in response to the prompt.

3. Identify key phrases (two or more words) that discriminate across the score points.

As new short-answer items are created, it is important to provide detailed documentation to assist in the design and construction of short-answer questions and scoring guidelines that will increase the reliability of machine scoring.

Finally, in this embodiment, when the content scoring module is trained to score a specific prompt, it is recommended that the sample size allow for the construction of three separate response sets, the normal training and validation sets as well as a verification set. This allows the content scoring module to use the training set to generate different scoring methods and the verification dataset to choose the "best" scoring model for the scoring of the validation data.

Content Scoring Module Overview:

The content scoring process begins with a standard metric, the cosine similarity coefficient, to determine the degree of similarity between two responses. In this analysis, the words used in the responses are listed on an x-axis and the frequency count of the occurrence of these words by individual response is listed on a y-axis. Through a process of administering the prompt to "live" students and then using expert humans to score these responses, the following matrix can be created.

Frequency Count/Score (by Individual Response)

| Word | 0-Point Responses | 1-Point Responses | 2-Point Responses |
| --- | --- | --- | --- |
| Word 1 | Freq. | | |
| Word 2 | Freq. | | |
| Word 3 | Freq. | | |
| Word 4 | Freq. | | |
| Word 5 | Freq. | | |
| Word n | Freq. | | |

The assumption is that similar responses contain similar words with similar frequency counts. In this analysis, the words of the responses are used as a vector to find the normalized dot product of the word list for each student response. By determining the cosine similarity coefficient, the user is effectively trying to find the cosine of the angle between the two objects. For cosine similarity coefficients resulting in a value of 0, the documents do not share any words because the angle between the objects is 90 degrees.

One standard method used to predict a score on an unscored response is to compare the unscored response to all the zero-point responses, then to all the one-point responses, and then to all the two-point responses (assuming a two-point maximum). Then the average cosine coefficient is computed for all the zero-point responses, all the one-point responses, and all the two-point responses. The highest cosine similarity coefficient (0, 1, or 2) indicates that the unscored response is most similar to that response set, and bases the predicted score on that assumption.

| Scored Student Responses | Mean Cosine Similarity Coefficient |
| --- | --- |
| 0-Point Response Set | Mean coefficient 1 |
| 1-Point Response Set | Mean coefficient 2 |
| 2-Point Response Set | Mean coefficient 3 |

Figure 5:
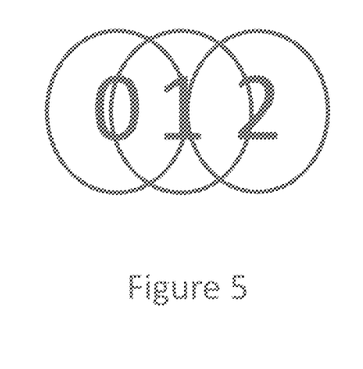
FIG. 5 graphically illustrates results yielded by the use of basic cosine similarity coefficient statistics to score short-response prompts.

Using basic cosine similarity coefficient statistics to score short-response prompts typically yields results as graphically illustrated in FIG. 5.

This approach does place a good portion of student responses in the general location on the rubric scale, but falls far below the accuracy of human scoring. Furthermore, low-performing and mid-range score responses generally perform less well, since their word selection is far less consistent and similar.

One aspect of the present invention is to use the cosine similarity coefficient, but extend the method significantly. The new method is an iterative modeling process called semantic content similarity scoring. The goal of this approach is to reduce the overlap area between the score points and hence improve the prediction model. This is achieved by refining the calculation and statistical manipulation of the content similarity coefficients in order to augment differences among the various score-point responses.

Figure 6:
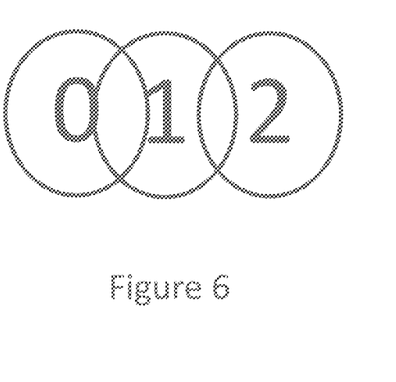
FIG. 6 graphically illustrates clearer discrimination between various score points as achieved by a more accurate prediction model from a matrix of cosine similarity coefficients generated by the improved method described herein.

As shown in FIG. 6, the enhanced method helps create a matrix of cosine similarity coefficients that improves the separation of the various score-point response sets and achieves a more accurate prediction model, as graphically illustrated in FIG. 6, wherein the various score points are more clearly discriminated by the enhancements to the cosine similarity coefficient approach.

The enhanced method includes innovative techniques that can be applied independently or collectively, in any combination, to generate an SCS scoring model. A brief description of these techniques is provided below.

1. The word list is extended to include phrases, synonyms, rubric scoring rules, and likelihood scores.

When these new entries are added to the word list, along with their frequency count or score values, the cosine coefficient calculation yields a more discriminating coefficient for each of the score-point response sets.

The content scoring module automatically creates the master word list by selecting words used from the higher-performing responses in the training response set. Depending on the number of score points, the software selects at least 33% and up to 50% of these responses. All the selected words are converted into root elements and then alphabetized. This word list is manually edited by the researcher, then used by the content scoring module to compute cosine similarity coefficients. This process is iterative; the user can repeat this step until the desired degree of accuracy is achieved in order to improve the performance of the rubric scoring rules and properly identify the score of a large portion (at least 60%) of the responses in the training set.

The word list is extended in the following ways.

a. Synonyms of key words are identified to help match similar student responses.

b. Key phrases (two or more words) are identified to discriminate responses across the score points.

c. Key rubric scoring rule components are identified.

d. Likelihood scores are included.

e. Stop words are removed from the cosine similarity coefficient calculation.

These new entries are included as shown below in an exemplary embodiment of a data structure of the augmented word list and frequencies.

Frequency Count/Score (by Individual Response)

| Word | 0-Point Responses | 1-Point Responses | 2-Point Responses |
|---|---|---|---|
| Word 1 | | | |
| Word 1 synonym | | | |
| Word 2 | | | |
| Word n | | | |
| Phrase 1 | | | |
| Phrase 2 | | | |
| Phrase n | | | |
| Rubric Scoring Rule 1 | | | |
| Rubric Scoring Rule 2 | | | |
| Rubric Scoring Rule Total | | | |
| Likelihood Score 0 | | | |
| Likelihood Score 1 | | | |
| Likelihood Score 2 | | | |

Rubric scoring rules enable the software to score each student response according to the guidelines outlined in the rubric provided by the item writer. Although not perfect, it appears that this feature enhances the overall accuracy of the automated scoring. The basic approach recommended is to create a rubric scoring rule in the word list for each score point defined in the item rubric provided by the item writer.

Likelihood scores are automatically created by the software to further discriminate responses into their proper score-point categories. Again, the likelihood score represents the probability that the response entered would be assigned a specific score by a human rater. There is a likelihood score for each score point on the scale. For example, on a two-point rubric, the software creates a Likelihood Score_0, Likelihood Score_1 and Likelihood Score_2.

As noted elsewhere in this disclosure, the possible range for this score ranges from 0 to 10. A score of 0 indicates an extremely low probability, while a score of 10 indicates a very high probability. These scores are extrapolated from the rubric scoring rules. The accuracy of these scores depends on the how well the rubric scoring rules simulate human scoring. The higher the accuracy of the rubric scoring rule, the more influence these scores have on the coefficients; the lower the accuracy, the less influence these scores have on calculation of the coefficients.

Calculating the cosine similarity coefficient with these additional entries now goes well beyond word similarity. When similar phrases, rubric scoring rules, and likelihood scores are included in the word list, the cosine similarity coefficient includes factors that measure the correctness of the student's response.

2. The content scoring module generates a cosine similarity coefficient matrix based on the complete word list.

| Scored Student Responses | 0-Point Response Set | 1-Point Response Set | 2-Point Response Set |
|---|---|---|---|
| Responses scored 0 (0-point response set) | Mean coefficient 1 | Mean coefficient 4 | Mean coefficient 7 |
| Responses scored 1 (1-point response set) | Mean coefficient 2 | Mean coefficient 5 | Mean coefficient 8 |
| Responses scored 2 (2-point response set) | Mean coefficient 3 | Mean coefficient 6 | Mean coefficient 9 |

These nine cosine similarity coefficients are created by computation of mean cosine similarity coefficients as follows.

a. Three cosine similarity coefficients are generated by comparison of the 0-point responses to the 0-point, 1-point, and 2-point response sets.

b. Three cosine similarity coefficients are generated by comparison of the 1-point responses to the 0-point, 1-point, and 2-point response sets.

c. Three cosine similarity coefficients are generated by comparison of the 2-point responses to the 0-point, 1-point, and 2-point response sets.

3. The master word list is replaced with a separate word list for each score point.

Utilization of a separate word list for each score-point response set helps the cosine similarity coefficient calculation better discriminate responses across score points. There are various approaches that can be used to decide which words are included in each score-point list. The content scoring module includes several separate optimization methods that can be used, collectively or in any combination, to create the separate word lists.

To optimize the word list, the content scoring module applies the following general steps for each score-point word list.

a. The cosine similarity coefficient is generated for each score-point response set.

b. One word at a time is excluded.

c. After each exclusion, the cosine similarity coefficient is recalculated.

d. If exclusion of a word improves the cosine similarity coefficient, the word is permanently removed from the list. If not, the word is put back into the list.

Each optimization method generates its own cosine similarity coefficient matrix. The resulting cosine similarity coefficients are automatically loaded into NeuroShell, or any comparable predictive software, to determine which optimization method predicts the "best."

4. The optimized word list is utilized to generate a unique set of cosine similarity coefficients for each score point. These additional cosine similarity coefficients help refine the content scoring module to augment differences among the various score-point responses.

| 0-Point Word List | 0-Point Response Set | 1-Point Response Set | 2-Point Response Set |
|---|---|---|---|
| 0-point response set | Mean coefficient 1 | Mean coefficient 4 | Mean coefficient 7 |
| 1-point response set | Mean coefficient 2 | Mean coefficient 5 | Mean coefficient 8 |
| 2-point response set | Mean coefficient 3 | Mean coefficient 6 | Mean coefficient 9 |
| 1-Point Word List | 0-Point Response Set | 1-Point Response Set | 2-Point Response Set |
| 0-point response set | Mean coefficient 1 | Mean coefficient 4 | Mean coefficient 7 |
| 1-point response set | Mean coefficient 2 | Mean coefficient 5 | Mean coefficient 8 |
| 2-point response set | Mean coefficient 3 | Mean coefficient 6 | Mean coefficient 9 |
| 2-Point Word List | 0-Point Response Set | 1-Point Response Set | 2-Point Response Set |
| 0-point response set | Mean coefficient 1 | Mean coefficient 4 | Mean coefficient 7 |
| 1-point response set | Mean coefficient 2 | Mean coefficient 5 | Mean coefficient 8 |
| 2-point response set | Mean coefficient 3 | Mean coefficient 6 | Mean coefficient 9 |

Each one of the optimized word list methods generates three cosine similarity coefficient matrixes.

5. The number of cosine similarity coefficients generated by the system is reduced by collapsing (or combining) adjacent response sets, which helps improve the discrimination of the score-point response sets.

| | | |
|---|---|---|
| Score point 0 | Score points 1-2 collapsed | |
| Score point 0 | Score point 1 | Score point 2 |
| Score points 0 - 1 collapsed | | Score point 2 |

6. The cosine similarity coefficients are loaded into NeuroShell for each optimization method, along with the master word list, and the optimization net that performs the "best" is automatically selected.

The outline below provides the general workflow used to train a prompt prior to operational scoring.

1. The configuration file contains parameters that can be set by the user to control the methods applied to the training and validation training sets. In one embodiment, this configuration file is edited in Microsoft Notepad.

2. In a preferred embodiment, the software used to implement the content scoring module includes a conversion method that will reformat student response, or paper set, files into the required file layout compatible with the Program.

3. The content scoring module automatically selects the words used by the top-performing student responses, converts each word to its root element, and creates a word list file 100. This word list can be augmented by the user as described above 103 and then used by the LSA analysis 302, 303 to compute cosine similarity coefficients 304 for the unscored response. Special syntax can be used to allow expansion of the word list to include synonyms, key phrases, and rubric scoring rules.

4. A rubric scoring rule entered into the word list generally has multiple parts that represent the points outlined in the rubric, as well as a weight indicating whether it is applied (1) or not applied (0) to each response. The content scoring module includes a pre-processing step that generates rubric scoring rules for each training response and summarizes the accuracy of the scores. This is an iterative process that can be repeated to achieve the desired level of accuracy. The user has the option to manually edit the word list and redo this step to improve the accuracy of the scoring.

5. Multiple algorithms can be used, each applying a different optimization method to produce a unique word list 111, 202 for each score point (score-specific word list) in the rubric. This process is automated. For example, a one-point rubric prompt will produce two word lists for each algorithm. The zero-point word list includes words that help the content scoring module properly identify zero-point responses, while the one-point response word list includes words that help target one-point responses.

6. For each optimization method, the content scoring module automatically creates a separate file to load into NeuroShell 114 in order to create a prediction model 115. In this example, that file contains a separate record for each training response that contains various information, such as the student identification (ID), prompt name, human score, and a set of cosine similarity coefficients.

Two additional techniques are applied to the calculation of the cosine similarity coefficients in order to improve the prediction. First, the cosine similarity coefficient matrix is collapsed, as described above.

Second, two separate matrices are computed (optimized vs. non-optimized).

7. Each optimization file is automatically loaded and analyzed by NeuroShell 114 to determine the "best" optimization method.

The training process includes routines to process a "verification" response set. It is important to note that NeuroShell produces a prediction model for each optimization method based on the training set, and then applies these models to the verification dataset to determine the "best" optimization method.

8. The final step in the process is to apply the "best" optimization method to the validation dataset, export the data to NeuroShell to create a final prediction model, and submit the validation scores to research scientists skilled in automated scoring methodologies for independent psychometric analysis.

In a preferred embodiment, NeuroShell is integrated into the content scoring module to automate the creation and selection of prediction models, making this step transparent to the user.

Key Content Scoring Module Components:

The present invention has several components that are integrated into a unique approach to score short-answer responses. These components are discussed in the following sections.

I. Rubric Scoring Rules
II. Likelihood Scores
III. Optimization Methods
IV. Cosine Similarity Coefficient Matrix I. Rubric scoring rules 102:

Rubric scoring rules are designed to allow the content scoring module to score the student response according to the guidelines outlined in the scoring rubric provided by the item writer.

In a preferred embodiment, the basic approach is to create a scoring rubric entry in the word list for each score point defined in the scoring guidelines. The rubric scoring rules, weighted 1 (applied) or 0 (not applied), are added to the end of the word list and included in the cosine similarity coefficient calculations.

The general approach used to implement rubric scoring rules is to study the rubric and the student training responses and then identify one or more key phrases that would indicate a correct response from the student. The constructions of these rubric scoring rules include several parameters that can be set to properly reflect the scoring guidelines. One example may include the following parameters for each rubric scoring rule.

a. Location of the key phase(s), including, for example:
  i. first sentence/paragraph
  ii. second sentence/paragraph
  iii. third sentence/paragraph
  iv. fourth sentence/paragraph
  v. remaining sentence/paragraph
  vi. any sentence/paragraph
b. The scoring weight applied to the rubric, as expressed in whole numbers or decimals.
c. The percentage of matched words in the rubric phrase.
d. Whether the rubric scoring rule is mandatory. If a rubric scoring rule is mandatory, failure to meet this rubric will mean all other rubric records will be scored at zero. In a multipart performance task, for example, a particular rubric scoring rule may be deemed mandatory, regardless of other rubric scoring rules, for a determination of full or partial score points.

e. Whether two or more rubric scoring rules require combined scoring. Multiple rubric scoring rules can be combined, using AND and OR.

Short Response Item Scoring Example:

The content scoring module extends the word list to include entries for each rubric scoring rule as well as a total rubric scoring rule. These additional entries into the word list provide additional information to the cosine similarity coefficient calculation that helps separate the responses into the proper score-point category.

An example of scoring rules is shown as follows for an item known as the "Baghdad Battery" prompt.

---

Stem

---

Explain the name Baghdad Battery and how it was discovered.
Include details from the article to support your answer.
Scoring Rules Key Element(s):
   Jar was discovered near Baghdad, Iraq, in 1936
   Some people believe jar could have been used as a battery
   because of the stopper, iron rod, and copper tube inside
   To work as a battery, an electrolyte would have been added
Point 2
Scoring Criteria
Response is a thorough explanation of the name Baghdad Battery
and its discovery and includes support from the article in the response.
Point 1
Scoring Criteria
Response is a limited explanation of the name Baghdad Battery and
its discovery and includes limited or no support from the article.

---

The following two rubric scoring rule are manually placed in the word list.

---

Rubric01(Loc = any sentence, Wt = 01, % = 60, Man = no)
discover_near_iraq
Rubric02(Loc = any sentence, Wt = 01, % = 60, Man = no)
clay_jar_copper
_|clay_jar_iron
_|clay_jar_medal
_|clay_jar_man_fist
_|clay_jar_copper_tube

---

Based on the scoring rules, one point is awarded if the student explains how the Baghdad Battery got its name by matching 60% (two out of three words) in the phrase "discovered near Iraq." It is useful to mention that the word list supports the following synonyms for discover:

--- discover
               discover/discovery
               discover/find
               discover/invent
               discover/invention

---

A second point is awarded when the student provides detailed information describing the battery. The content scoring modules assigns one point if the student response matches at least 60% (two out of three words or three out of four words) in any of the following five phrases. The words must be located in the same sentence of the response.

--- clay jar copper
               clay jar iron
               clay jar medal
               clay jar man fist
               clay jar copper tube

---

II. Likelihood Scores:

Likelihood scores further discriminate papers into their proper score-point categories. Again, the likelihood score represents the probability that the response entered would be assigned a specific score by a human rater. There is a likelihood score for each score-point on the scale. For example, on a two-point rubric, the content scoring module creates a Likelihood Score_0, Likelihood Score_1, and Likelihood Score_2. These additional scores are entered into the word list to be utilized by the cosine similarity coefficient calculation.

In various embodiments, the likelihood score ranges from 0 to 10. A score of 0 indicates an extremely low probability while a 10 indicates a very high probability. Likelihood scores are extrapolated from the scores generated from the rubric scoring rules. A likelihood score of 5 would roughly represent a 50% probability of being correct while a score of 8 would roughly represent an 80% probability. The accuracy of these scores depends on how well the rubric scoring rules simulate human scoring. The higher the accuracy, the more influence these scores have on the cosine similarity coefficients. The lower the accuracy, the less impact these scores have on calculation of the cosine similarity coefficients.

Calculation of the likelihood scores is based on the frequency distribution of a two-dimensional matrix of human scores vs. computer scores on the complete set of training responses.

In an example item, likelihood scores are generated for the Baghdad Battery prompt as follows:

Score Distribution by Response Training Set

| Scores | 0 | 1 | 2 |
|---|---|---|---|
| Responses Scored 0 | 55 | 13 | 1 |
| Responses Scored 1 | 2 | 70 | 8 |
| Responses Scored 2 | 0 | 8 | 39 |

The following steps outline the calculation of likelihood scores in this example:
1. The sum of the Score 0 row is 69. This number indicates the computer-generated number of zero-point responses.
2. Divide 55/69, 13/69 and 1/69 to yield 0.797, 0.188, and 0.014—roughly 80%, 19%, and 1%. This percentage compares the generated score vs. the actual score.
3. The following table provides empirically derived cutscores. Convert the percentages obtained in step 2 to likelihood scores using this table. In this example, conversion to likelihood scores yields 8, 2, and 0.

| Cutscore Percentage | Likelihood Score |
|---|---|
| 0-5% | 0 |
| 6-15% | 1 |
| 16-25% | 2 |
| 26-35% | 3 |
| 36-45% | 4 |
| 46-55% | 5 |
| 56-65% | 6 |
| 66-75% | 7 |

| Cutscore Percentage | Likelihood Score |
|---|---|
| 76-85% | 8 |
| 86-95% | 9 |
| 96-100% | 10 |

The following table shows the likelihood scores for the Baghdad Battery prompt:

Likelihood Score Weights

| Scores | 0 | 1 | 2 |
|---|---|---|---|
| Responses Scored 0 | 8 | 0 | 0 |
| Responses Scored 1 | 2 | 9 | 2 |
| Responses Scored 2 | 0 | 1 | 8 |

III. Optimization Methods:

Traditionally, one word list is used to compute the cosine similarity coefficients for each student response. Responses with similar content have similar cosine similarity coefficients. To predict the score of a student response, the response is compared against all the zero-point responses, then the one-point responses, and so on. This comparison yields a separate cosine similarity coefficient for each score-point response set. The highest cosine similarity coefficient indicates the most probable score for that response.

One unique method applied to the cosine calculation in this invention is the selection and use of separate word lists for each score-point response set 111, 202. The content scoring module analyzes the complete word list, and then applies several optimization techniques to improve the separation of cosines among the score-point responses, as described above. All optimization methods automatically generate their own sets of cosine similarity coefficients. These cosine similarity coefficients are loaded into Neuro-Shell to determine the technique that predicts the "best."

IV. Cosine Similarity Coefficient Matrix 113:

Traditionally, a response's score is predicted by calculating a cosine similarity coefficient for each score point (based on the comparison of that response to each of the score-point response sets). The present invention extends that concept and computes a set of cosine similarity coefficients for each optimized score-point word list 112, 111. This provides a two-dimensional matrix of cosine similarity coefficients 113 and provides more information on which to base the score prediction.

An exemplary two-dimensional cosine similarity coefficient matrix for a three-point response is as follows.

| Average correlation of the training data by score paper. | | | | |
|---|---|---|---|---|
| | 0 | 1 | 2 | 3 |
| Word list 0 | | | | |
| 0 papers. | 0.7923 | 0.7487 | 0.4769 | 0.2687 |
| 1 papers. | 0.7487 | 0.7200 | 0.4972 | 0.3238 |
| 2 papers. | 0.4769 | 0.4972 | 0.4326 | 0.3975 |
| 3 papers. | 0.2687 | 0.3238 | 0.3975 | 0.5044 |
| Word list 1 | | | | |
| 0 papers. | 0.8611 | 0.8515 | 0.5819 | 0.3674 |
| 1 papers. | 0.8515 | 0.8534 | 0.6223 | 0.4301 |
| 2 papers. | 0.5819 | 0.6223 | 0.5423 | 0.4650 |
| 3 papers. | 0.3674 | 0.4301 | 0.4650 | 0.4779 |
| Word list 2 | | | | |
| 0 papers. | 0.8232 | 0.8300 | 0.6358 | 0.3971 |
| 1 papers. | 0.8300 | 0.8417 | 0.6764 | 0.4592 |
| 2 papers. | 0.6358 | 0.6764 | 0.6281 | 0.5388 |
| 3 papers. | 0.3971 | 0.4592 | 0.5388 | 0.5646 |
| Word list 3 | | | | |
| 0 papers. | 0.8082 | 0.4299 | 0.1016 | 0.0554 |
| 1 papers. | 0.4299 | 0.3414 | 0.2656 | 0.2923 |
| 2 papers. | 0.1016 | 0.2656 | 0.4196 | 0.5399 |
| 3 papers. | 0.0554 | 0.2923 | 0.5399 | 0.7327 |

The content scoring module generates a different number of cosine similarity coefficients depending on the number of score points in the rubric. In one example, the following table shows the number of cosine similarity coefficients generated by the content scoring module per score point.

| Score Points | Number of Cosine Similarity Coefficients |
|---|---|
| 2 | 8 |
| 3 | 14 |
| 4 | 20 |
| 5 | 26 |
| 6 | 32 |

Figure 4:
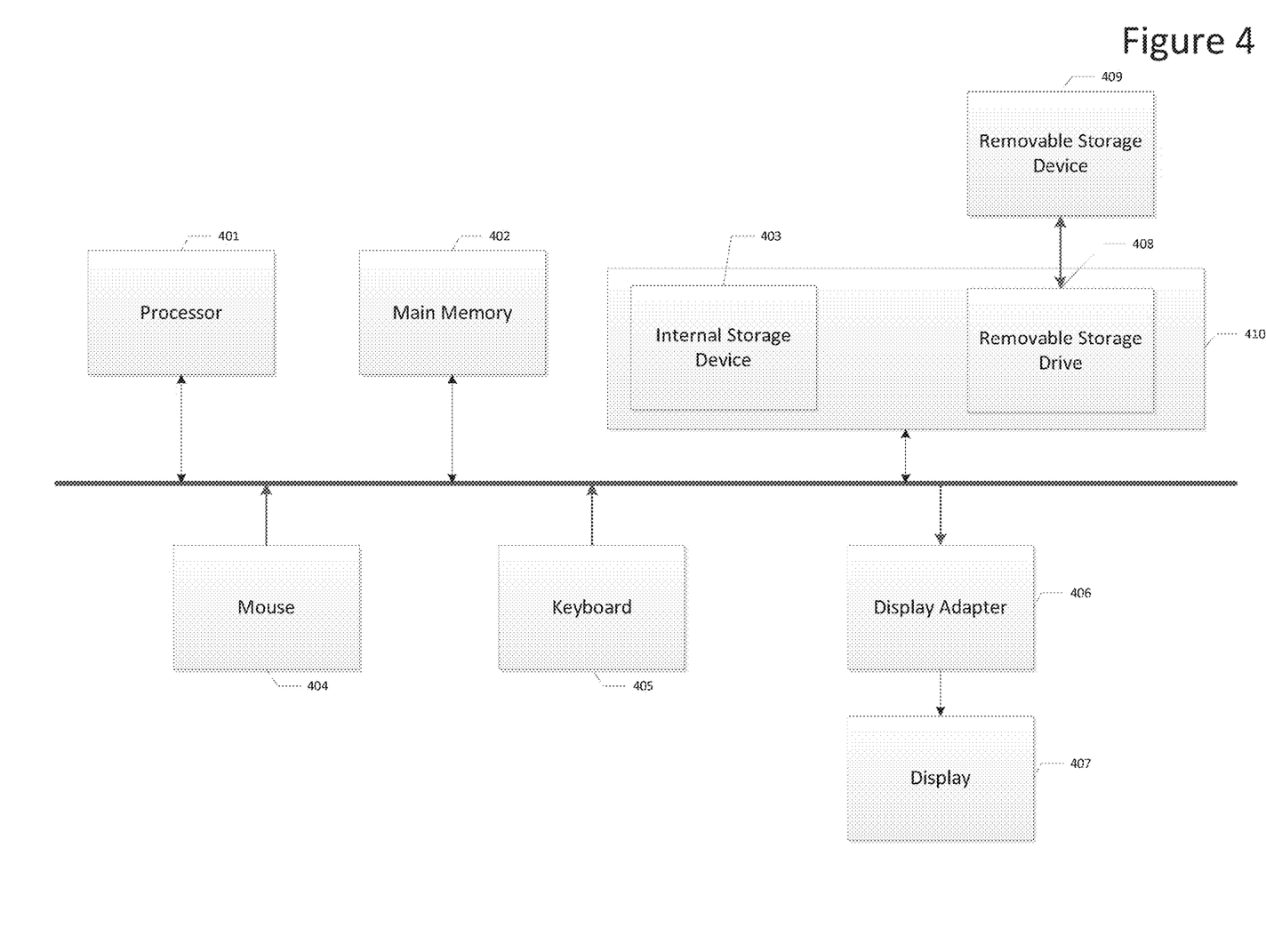
FIG. 4 is a block diagram showing system hardware components.

Aspects of the invention are implemented via computing hardware components, user-created software, data storage components, data input components, and data output components. Hardware components include computing and control modules, such as microprocessors and computers 401, 402, permanent and removable storage devices 403, 408, 409, 410, input devices such as keyboard, mouse 405, 404, and various sensors, including sensing of eye motion or gesture, display devices such as a monitor screen 406, 407 or virtual projector or augmented reality device, configured to effect computational and/or control steps by receiving one or more input values, executing one or more algorithms (e.g., algorithms described above) stored on non-transitory machine-readable media (e.g., software or data in Cloud storage) that provide instruction for manipulating or otherwise acting on the input values, and output one or more output values, such as predicted scores for unscored responses. Such outputs may be displayed, printed, spoken, or otherwise indicated to a user for providing information to the user. For example, response score(s) and/or results of an assessment of which the response is a part, or such outputs may comprise inputs to other processes and/or control algorithms, such as an adaptive learning program that generates user-specific instructional content based on user assessment results. Data input components comprise elements by which data is input for use by the control and computing hardware components. Such data inputs may comprise manual input elements, such as keyboards 405, mouse 404, touchscreens, microphones, switches, manually operated scanners, etc., as well as machine input devices, such as scanners or motion sensors. Data output components may comprise hard drives or other storage media, monitors 407, printers, indicator lights, or audible speech or signal elements (e.g., buzzer, horn, bell, etc.).

Content scoring module software comprises instructions stored on non-transitory computer-readable media, such as instructions implementing a process or processes described above, which, when executed by the control and computing hardware, cause the control and computing hardware to perform one or more automated or semi-automated processes embodying aspects of the invention. Suitable programming language for implementing the methodology describe herein includes C# using the Windows XP operating system available from Microsoft, although the methodology could be implemented using any platform with any programming language that has good support for matrix mathematics. Documentation describing exemplary software implementing aspects of the invention is attached as an appendix to this specification.

While the present invention has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the inventions requires features or combinations of features other than those expressly recited in the claims. Accordingly, the present invention is deemed to include all modifications and variations encompassed within the spirit and scope of the following appended claims.

The invention claimed is:

1. An automated method of scoring a constructed response implemented by a computer, said computer comprising a content scoring module, said content scoring module comprising tagging or parsing software and a machine learning engine, said method comprising:
   (a) with said tagging or parsing software, computing the frequencies with which entries of a master word list file occur in each of a plurality of training responses, wherein the training responses comprise a plurality of known scores comprising all possible scores achievable for the response;
   (b) with said content scoring module, computing one or more coefficients for each of the training responses based on the frequencies computed in step (a);
   (c) with said content scoring module, composing a score-specific word list for each possible score achievable on the response by, for each possible score:
      (i) removing one or more entries from the word list to create a modified word list;
      (ii) computing the coefficients for each response at that possible score based on the modified word list;
      (iii) compare the coefficients computed in step (e) for each response at that possible score;
      (iv) computing the coefficients for each response at one or more other possible scores based on the modified word list;
      (v) compare the coefficients computed in step (iv) with the coefficients computed in step (ii);
      (vi) determining, based on the comparison of step (v), whether to keep the entry out of the word list or put the entry back into the word list;
      (vii) repeating steps (i) through (vi) one or more times to develop the score-specific word list for that possible score;
   (d) with said content scoring module, repeating step (c) rubric scoring rule for each possible score achievable on the response;
   (e) with said content scoring module, computing coefficients for each training response based on the score-specific word lists developed in steps (c) and (d), wherein the number of computed coefficients is reduced by collapsing adjacent response sets;
   (f) with said content scoring module, computing coefficients for an unscored response based on each of the score-specific word lists;
   (g) with said content scoring module, comparing the coefficients computed for the unscored response in step (f) with the coefficients computed for each training response in step (e), wherein said comparing comprises said content scoring module submitting the coefficients computed for the unscored response in step (f) and the coefficients computed for each training response in step (e) to said machine learning engine; and
   (h) with said machine learning engine, predicting a score for the unscored response based on the comparison of step (f).

2. The method of claim 1, wherein step (c)(iv) comprises computing coefficients for each response at the highest score achievable for the response.

3. The method of claim 1, wherein step (c)(iv) comprises computing coefficients for each response at the next higher score achievable for the response from the score for which the score-specific word list is being developed.

4. The method of claim 1, wherein step (c)(iv) comprises computing coefficients for each response at the next higher score and the next lower achievable for the response from the score for which the score-specific word list is being developed.

5. The method of claim 1, wherein step (c)(iv) comprises computing coefficients for each response at the next two higher scores achievable for the response from the score for which the score-specific word list is being developed.

6. The method of claim 1, further comprising augmenting a word list used in step (a) by adding one or more non-word variables.

7. The method of claim 1, further comprising augmenting a word list used in step (a) by one or more of:
   reducing words to root words;
   combining words that are synonyms into a single word;
   incorporating one or more phrases of at least two words;
   incorporating values based on a rubric for scoring a response; and
   incorporating values based on a likelihood that a score of the response based on a rubric is accurate.

8. An automated method of scoring a constructed response implemented by a computer, said computer comprising a content scoring module, said content scoring module comprising a text-reading program and a machine learning engine, said method comprising:
   (a) with said computerized text-reading program, computing the frequencies with which entries of a master word list file occur in each of a plurality of training responses, wherein the training responses comprise a plurality of known scores comprising all possible scores achievable for the response;
   (b) with said content scoring module, computing one or more coefficients for each of the training responses based on the frequencies computed in step (a);
   (c) with said content scoring module, composing a score-specific word list for each possible score achievable on the response by modifying the master word list by adding and/or removing entries from the master word list file to derive a word list that increases the computed discrimination between responses with dissimilar scores or increases the computed similarities between responses with similar scores;

(d) with said content scoring module, computing coefficients for each training response based on the score-specific word lists developed in steps (c), wherein the number of computed coefficients is reduced by collapsing adjacent response sets;

(e) with said content scoring module, computing coefficients for an unscored response based on each of the score-specific word lists;

(f) with said content scoring module, comparing the coefficients computed for the unscored response in step (e) with the coefficients computed for each training response in step (d), wherein said comparing comprises said content scoring module submitting the coefficients computed for the unscored response in step (e) and the coefficients computed for each training response in step (d) to said machine learning engine; and (g) with said machine learning engine, predicting a score for the unscored response based on the comparison of step (f).

9. The method of claim 1, wherein said machine learning engine comprises a neural network and one or more genetic algorithms.

10. The method of claim 8, wherein said machine learning engine comprises a neural network and one or more genetic algorithms.

* * * * *